Patented Aug. 10, 1954

2,686,164

UNITED STATES PATENT OFFICE 2,686,164

POLYESTERS FROM ALKYLIDENE POLYARYLOXYALCOHOLS

James A. Arvin, Homewood, Ill., and Theodore Greenfield, Baltimore, Md., assignors to The Sherwin-Williams Company, Cleveland, Ohio, a corporation of Ohio No Drawing. Application December 2, 1949, Serial No. 130,872

7 Claims. (Cl. 260—22)

This invention relates to improved oil soluble polymeric compounds useful in the protective and decorative coatings arts.

One object of the invention is to provide a novel class of resins characterized by superior resistance to chemical attack.

Another object of this invention is to provide a novel polymeric ester which is compatible with organic solvents and oils so that solutions of the oil modified resins may be utilized in coatings which may be either baked or air dried to form insoluble infusible films.

Another object is to provide a polymeric condensation product useful in combination with other elastomeric compounds to alter the general physical and chemical nature of the combination.

A specific object is to provide an oil modified polymeric ester of an aromatic ether alcohol having one or more aromatic nuclei by condensing together a polybasic acid, an aromatic polyoxyalkanol, an aliphatic polyhydric alcohol, and an unsaturated monobasic acid of relatively high molecular weight (e. g., above 250) to produce resinous products useful either by themselves or in conjunction with other materials.

Other and varied objects will be apparent upon a detailed consideration of the specification and the examples herein disclosed.

The products of the invention may be described generically as resins which are the products of the reaction of at least one polycarboxylic organic acid, at least one polyhydric alcohol in which at least a portion of the polyhydric alcohol is an aromatic polyoxyalkanol and at least one unsaturated monocarboxylic acid.

The preferred products of the invention are made by the condensation of an aryl polyoxyalkoxy ether alkanol, an aliphatic polyhydric alcohol, a polycarboxylic organic acid and an additional reactant characterized by an unsaturated monobasic carboxylic acid radical, for example, unsaturated aliphatic carboxylic acids, unsaturated drying oil fatty acids, unsaturated drying oil total and partial esters of polyhydric alcohols, rosin acids, dehydrogenated rosin acids, unsaturated hydrogenated rosin acids and disproportionated rosin acids. The unsaturated fatty acid may be derived by alcoholysis of natural triglycerides with glycerine, pentaerythritol or another alcohol to form a complex mixture of partial esters of glycerine and a drying oil acid. Rosin and its derivatives are preferably substituted partially for the fatty acids in some formulations on a carboxyl equivalent basis.

As compared with previously known alkyd resins, the products of the invention are characterized by increased alkali resistance and hardness without excessive brittleness.

By the term "polycarboxylic acid" is intended to include the acids heretofore proposed in the art and used in forming alkyds in conjunction with aliphatic polyhydric alcohols. Among the useful acids are the saturated aliphatic dicarboxylic acids, preferably above malonic, including especially but limited to those having 4 to 36 carbon atoms, e. g., succinic, methyl succinic, monomercapto succinic, glutaric, adipic, methyl adipic, pimelic, mercapto pimelic, suberic, azelaic, sebacic and mercapto sebacic, alpha-beta unsaturated acids and their halogenated and hydrogenated derivatives including especially but not limited to those having 2 to 6 carbon atoms, e. g., maleic, fumaric, citraconic, measconic, itaconic, aconitic, glutaconic, acetylene dicarboxylic, and the halogen derivatives illustrated by dichlorosuccinic acid; and the hydroxy substituted dibasic acids as exemplified by citric, tartaric, and malic acids. Still other polybasic acids of an aromatic, cyclic, or polycyclic type have been found advantageous, and included as illustrative are phthalic anhydride, isophthalic acid, terephthalic acid, orthophthalic acid, naphthalic acid, camphoric acid, diphenic acid, the alphabeta unsaturated acid (e. g., maleic acid) condensation products (via diene addition) with terpenes, cyclopentadiene, dicyclopentadiene, isoprene, styrene, rosin, and other similar diene addition compounds, both monomeric and polymeric.

If alpha-beta unsaturated acids are used before diene addition products from them are formed as described, caution must be exercised as to the amount used, the temperature of the cook and the degree of functionality of the polyhydric alcohol. The alpha-beta unsaturated acids are seldom used alone, but general practice is to combine less than 10% of the alpha-beta unsaturated acid with another less reactive dibasic acid (e. g., adipic). As maleic acid has four points of reactivity, two points due to the carboxylic acid groups and two points available from the olefine linkage, maleic anhydride is referred to as tetra-functional, and glycerine, having three points of reaction, is referred to as tri-functional. When the functionality of each of the reactants is above two, e. g., maleic anhydride as the polybasic acid and glycerine and bis(hydroxy propoxy phenyl) dimethyl methane as the alcohols, there is grave danger of premature gelation before the acid value of the resin produced is reduced to a suitable low and practical level. However, maleic acid or anhydride can be used after reduction of its functionality by diene addition with other unsaturated compounds or in small amounts directly in combination with other less reactive dibasic acids and unsaturated monobasic acids. Such a mixture of acidic components can be reacted with polyhydric alcohols under controlled time-temperature cycles to form low acid value resin and fatty oil modified polymeric products having heat-convertible properties to form insoluble, infusible films useful both as air-drying and as baking finishes.

Among the useful unsaturated monobasic acids are the long chain acids, e. g., those containing 6 to 30 carbon atoms, derived from vegetable seed and animal origin exemplified by linseed, soya bean, cotton seed, tung nut, perilla and chia seed, safflower and sunflower seed, hydrated oil from the castor bean and the fish oils. As previously indicated, rosin and its acid modifications are also useful unsaturated monobasic acids as partial or total substitutes for the monobasic drying oil fatty acids.

Oil and resin modified products resulting from such condensations can be dissolved in inexpensive solvents and will dry when exposed to air in thin films. They can also be baked, after application by brushing, spraying or dipping techniques, to provide useful industrial finishes.

Within the broad scope of the generic class of compounds herein referred to as aryl polyoxyalkoxy ether alkanols are several sub-generic classes of compounds. One class may be described as aromatic ether alcohols having a single aromatic ring and a plurality of ether alcohol groups attached thereto and another class as aromatic ether alcohols having two or more aromatic rings each with at least one attached ether alcohol group, as will be illustrated more fully hereinafter.

AROMATIC ETHER ALCOHOLS HAVING A SINGLE AROMATIC NUCLEUS

The compounds of interest in the practice of the invention herein disclosed are those characterized by a single aromatic nucleus, a plurality of ether linkages and plurality of aliphatic hydroxy groups in association with the said ether groups.

Among the useful basic phenolic compounds from which these hydroxy ethoxy compounds can be made are the dihydric phenols which include resorcinol, hydroquinone, catechol and orcinol.

A second group of this class concludes the trihydric phenols, including phloroglucinol (1,3,5 trihydroxy benzene), pyrogallol (1,2,3 trihydroxy benzene), hydroxy quinol (1,2,4 trihydroxy benzene).

Any one of the above class of polyhydric phenols having a single phenyl nucleus may serve as an intermediate to be further reacted to form the members of the sub-generic class herein described. One method is to first form a water-soluble alkaline salt of the selected phenol in the presence of excess alkali in aqueous solution. After forming a solution of the salt, an amount of an alkylene halohydrin, preferably in slight excess of molecular equivalence to the number of phenolic hydroxy groups, is added to the solution and the condensation reaction assisted by heating. By this method accurate and definite compounds having alkoxy chains of known length may be produced, e. g., one alkoxy group per phenolic hydroxy group. This is a preferred method. Alternatively, it is also possible to react one or more alkylene oxide groups with each phenolic hydroxy group to arrive at the same or similar compositions. In the latter instance, the reaction proceeds more favorably under pressure in non-aqueous systems. If such method is used a limitation in certain instances arises in the ultimate water sensitivity of alkyd polymers made therewith.

Preferred compounds of this class are illustrated by the general structural formula

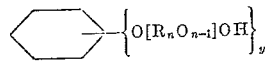

where $n$ may vary from one through four, $y$ may be two or three, and R is alkylene, e. g., ethylene and 1,2 propylene.

POLYETHER ALCOHOLS HAVING MORE THAN ONE AROMATIC GROUP IN THE NUCLEUS

This class of aromatic polyoxyalkanols may be made through the condensation of two or more mols of a selected phenol with one mol of an aldehyde or a ketone followed by reaction of the resultant polyphenol with either (1) an amount of an alkylene chlorohydrin equivalent to the number of phenolic hydroxy groups in the condensed polyphenol, or (2) at least one and preferably not more than four mols of an alkylene oxide per phenolic hydroxy group of the parent phenol, said condensation taking place under conditions which are well known in the chemical art.

Among the useful phenols which can be condensed to form polynuclear phenols are phenol, the substituted phenols, e. g., cresol, xylenol, the isomeric forms of butyl, amyl, octyl, decyl and dodecyl phenol, alicyclic phenols, e. g., cyclohexyl and methyl cyclohexyl phenols, aromatically substituted phenols, e. g., phenyl phenol, tolyl and naphthyl phenols, and hydroxy diphenyl.

Other phenols are also extremely valuable in forming intermediates useful in the formation of new synthetic drying oils, straight (unmodified) alkyd type resins, and drying oil and rosin modified alkyd type resins having special importance in the protective and decorative coatings field. Among the useful dihydric phenols as intermediates are hydroquinone, resorcinol, catechol, dihydroxy biphenyl and orcinol. Among the useful trihydric phenols are phloroglucinol, pyrogallol and hydroxy quinol.

A most general method of condensing the phenols to form the described class of polynuclear phenols is through reaction of two or more mols of the selected phenol with an aldehyde in an acid medium, e. g., hydrochloric acid, to form the desired phenolic hydroxy compound. As an alternative to the use of an aldehyde, a ketone may be condensed with the selected phenol in similar proportion. Compounds of the general type resulting have been previously described in the literature. Some descriptions of the prior art concern triphenyl methane type dyes. (See "The Synthetic Dyestuffs and Intermediate Products" by Cain and Thorpe, published 1933 by L. Griffin & Co., Ltd., London, page 156). U. S. Patent No. 2,331,265 describes certain members of the group, and the patent art concerning additives to fats to prevent rancidity illustrates many variations of the available parent phenols.

Aldehydes illustrative of those useful in the formation of the polyphenols include formaldehyde, acetaldehyde, propionaldehyde and benzaldehyde. The aldehydes determine the nature of the linking group between the phenols. If propionaldehyde is the aldehyde and phenol the selected aromatic, the resulting compound may be called "diphenylol propane."

Parent polyphenols of the class above indicated as formed by condensation of at least two mols of the selected phenol with one mol of the selected aldehyde to form polyhydroxy polyphenols, the aromatic nuclei of which are joined through a single carbon atom which may or may not be asymmetric, depending upon the aldehyde (or ketone) employed, are numerous as indicated by the following: p-p' dihydroxy diphenyl methane, triphenylol methane, di(4-hydroxy-phenyl) dimethyl methane, di(4-hydroxy-phenyl-) propyl methane, di(4-hydroxy-phenyl) methyl ethyl methane, p-hydroxy biphenyl 2(4-hydroxy naphthyl) methane, 4-4' dihydroxy 2-2' dinaphthyl methane, 1-1 di(4-hydroxy-phenyl-) cyclohexane, and di(4-hydroxy naphthyl) methane. Illustrative of another parent polyhydric phenol within the scope of the disclosure is p-p' dihydroxy biphenyl.

Compounds of the character of those described above are further reacted with one mol of an alkylene halohydrin for each phenolic hydroxy group under strongly alkaline conditions in an aqueous medium, or alternatively, from one to four mols of an alkylene oxide may be condensed with each phenolic hydroxy group in the compound selected as previously suggested. Preferred polyether alcohols having more than one phenyl group in the nucleus can be illustrated by the general structural formula

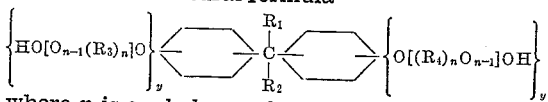

where $n$ is a whole number from one to four, $y$ is a whole number from one to three, $R_1$ is hydrogen, phenyl or an alkyl (e. g., methyl, ethyl, propyl, etc.) group, $R_2$ is hydrogen or an alkyl group, and $R_3$ and $R_4$ are the same or different alkylene groups, e. g., ethylene and 1,2 propylene.

An additional sub-generic group of parent compounds of the polyphenol class, useful for the purposes of this invention, include those formed by the condensation of two mols of a naphthol (e. g., beta naphthol) with one mol of an aldehyde or ketone. In such a condensation the resultant product may be termed a polynaphthol. With these phenols, as in the earlier described phenols, each hydroxy group of the polynaphthol is further reacted, either in an anhydrous condition with from one to four mols of an alkylene oxide, or, in an aqueous alkaline solution as the salt (e. g., the disodium salt of bisnaphthol) with one mol of an alkylene halohydrin for each phenolic hydroxy group to form compounds of this sub-generic class. Preferred compounds of this class may be illustrated by the following structural formula

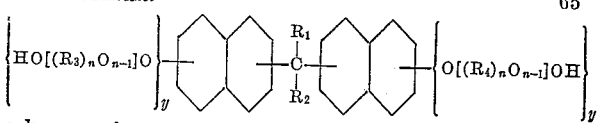

where $n$ is a whole number from one through four, $y$ is a whole number from one to three, $R_1$ is phenyl, alkyl (e. g., methyl, ethyl, propyl, etc.) or hydrogen, $R_2$ is hydrogen or alkyl, and $R_3$ and $R_4$ are the same or different alkylene groups, e. g., ethylene and 1,2 propylene.

Aromatic polyoxyalkanols are formed preferably by reaction of a polyhydric phenol in an aqueous alkaline medium through condensation of the phenol with an alkylene halohydrin. An alkylene oxide can also be used instead of the alkylene halohydrin, but the control of the resultant composition is less positive. The alkylene oxide will add at the phenolic group of greatest activity, possibly to the detriment of a less reactive hydroxy group. With the use of alkylene oxides, pressure equipment and anhydrous conditions favor higher yields of the desired product.

The addition of the alkylene halohydrin or alkylene oxide to the selected parent phenol performs several useful purposes. Prior to the addition thereto, esterification of the phenolic hydroxy group could only be obtained by indirect means or through use of very strong acids, this for the reason that the phenolic hydroxy group is more acidic than alcoholic in nature. It is believed that the ether linkage formed by the addition of an alkanol group to the phenol contributes in some measure to the increased chemical resistance of the resinous products herein described but that the aromatic nuclei are probably chiefly responsible for the improvement in chemical resistance over the prior art products wherein the polyol was purely aliphatic, e. g., glycerine, pentaerythritol, sorbitol, mannitol, and polypentaerythritol.

Aryl polyoxyalkoxy ether alkanols having multiple aromatic nuclei are numerous and include a large number of compounds which can be generally considered as alkanes or derivatives of the members of the methane series, for example, bis(beta hydroxy ethoxy ethoxy phenyl) methane, bis(hydroxy propoxy propoxy o-tolyl) methane, bis(hydroxy propoxy phenyl) dimethyl methane, tris(hydroxy ethoxy phenyl) methane, (hydroxy ethoxy biphenyl)-(hydroxy ethoxy naphthyl) methane, bis(hydroxy ethoxy naphthyl) methane, 4,4' bis(hydroxy ethoxy) biphenyl and 4-4' bis(hydroxy propoxy) biphenyl.

The above described aromatic polyoxyalkanols can also be called alkylidene polyaryloxyalcohols and can be characterized by the general formula

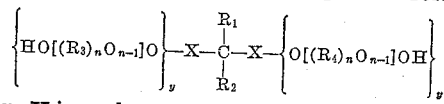

where X is arylene, $n$ is a whole number from one through four, $y$ is a whole number from one to three, $R_1$ is from the group consisting of phenyl, alkyl and hydrogen, $R_2$ is from the group hydrogen and alkyl, and $R_3$ and $R_4$ are alkylene groups.

In employing the aromatic polyoxyalkanols in conjunction with other polyhydric alcohols as herein described consideration must be given to the functionality of the reactants. Where the functionality of the reactants is above two precautions shown be taken to provide sufficient excess of hydroxyl equivalent or to otherwise block the cross-linking of polymeric chains formed during the reaction. Generally speaking, when the product to be made gels before the acid value is below about 20 the following changes will overcome the difficulty: (a) increase the amount of free hydroxyl groups in the resultant polymer, (b) lower the cooking temperature and increase the time of cook, (c) decrease the reactants having a functionality of greater than two with appropriate increases in the reactants of equivalent character having a functionality of two or less, (d) increase the percentage of unsaturated aliphatic monocarboxylic acid, and (e) replace the unsaturated organic acids of conjugated double bond structure and high iodine value in favor of unsaturated acids of isolate double bond structure and lower iodine number. Depending upon the functionality of the acids and alcohols employed and the amount of modification due to unsaturated acids, from 1½% to 100% excess alcohol equivalents may be included, preferably from 1½% to 30%. Too great an excess alcohol will seriously interfere with the final quality of films containing such products. Generally speaking, it is advisable to carry at least one molecular equivalent of fatty acid per repeated unit of the polymer calculated to insure compatibility of the resulting resin in the organic solvents used in the varnish-maker's art.

In the above described aryloxy alkoxy alkanol type resinous condensates, the percentage of oil in the polymer can be varied over wide limits depending upon the type of end product desired. Thus, a low oil content polymer is formed by condensing 3 mols of phthalic anhydride, 4 mols of bis(hydroxy propoxy phenyl) dimethyl methane and 2 mols of drying oil fatty acid (e. g., soya bean oil fatty acids) by first esterifying the reactants at a temperature into a bodying range of from 450 degrees F. to 600 degrees F. and preferably between 500 degrees F. and 580 degrees F. to form a soft polymer having somewhat less than 25% oil content.

A more generally useful class of polymers contains a higher percentage of drying oil fatty acid and is illustrated, for example, by the specific proportion of reactants of 2 mols of glycerine, 2 mols of bis(hydroxy propoxy phenyl) dimethyl methane, 2 mols of unsaturated fatty acid and 4 mols of phthalic anhydride. The resulting polymer is made at temperatures below about 450 degrees F. and is essentially linear being formed through ester linkages. The resultant polymer contains very nearly 30% oil.

As an illustration of a polymer formed with a tetra-functional alcohol, three mols of bis(dihydroxy diethoxy phenyl) methane are condensed with three mols of phthalic anhydride and six mols of unsaturated fatty acids at temperatures below 450 degrees F. to yield a series of units in a polymer joined through ester linkages and containing about 50% of oil.

As a further illustration, four mols of pentaerythritol are condensed with one mol of bis(hydroxy propoxy phenyl) dimethyl methane, five mols of phthalic anhydride and 8 mols of unsaturated fatty acid to yield a polymer having considerably greater quantity of oil per polymer unit. In this specific case, about 62% of oil has been linked into the polymer.

As the functionality of the alcohol or alcohols is increased, a greater range of combinations and permutations become possible to produce useful products. The range of from about 25% to about 60% oil, based on the polymer represents the preferred percentage of oil modification. The combined use of the aliphatic polyhydric alcohols and the ether alcohols herein described containing an aromatic nucleus provides an entirely new class of polymers for employment in protective coatings.

The polyesters herein described can be used either alone or in admixture with drying oils, other resins, either natural or synthetic, and modified organic solvent soluble cellulose derivatives, or copolymers, as coating compositions. To these compositions can be added pigments and colors, driers, and other film modifiers, e. g., plasticizers.

The condensations are carried out in accordance with the usual esterification procedure, and can be accomplished either with or without a catalyst, or in a solvent medium commonly called a "solvent cook," or in a varnish type kettle equipped with standard auxiliary aids such as thermometer, agitator, inert gas blow ring, cover and condenser. Superatmospheric pressures may be utilized, but the reaction is preferably conducted under atmospheric pressure. Water can be distilled and caught in a side arm trap under a "solvent cook" while solvent is returned to the batch or may be removed from the reaction mass by ordinary volatilization therefrom during the cook, assisted by an inert gas blow, if desired, as in an ordinary varnish cooking procedure.

The solvent serves to assist in the removal of water formed in the reaction and as a means of temperature control. Benzene, toluene, xylene, ethylene chloride and other azeotropic solvents are useful solvents in cooking procedures.

The end point of the reaction can be determined to some extent by measuring the amount of water of reaction and comparing it with the quantity of water theoretically produced by esterification between the polybasic acid and the polyhydric alcohol. The reaction may also be considered to be terminated when the acid value no longer decreases upon further heating. Temperatures in the range of 250 degrees F. to 480 degrees F. and heating periods from several hours to 72 hours have been employed in the practice of the invention where linear polymers are primarily desired. Higher temperatures up to 600 degrees F. are employed where more complex polymerization is desired.

The following examples are illustrative of the formation of certain novel oil modified resinous condensation products, but the illustrations are not intended to be exclusive. All parts and percentages given herein are by weight unless otherwise specified.

EXAMPLE I 75 parts xylene
637 parts heat bodied dehydrated castor oil
228 parts glycerine
0.51 part litharge
175 parts bis(hydroxy propoxy phenyl) dimethyl methane
445 parts phthalic anhydride
3 parts triphenyl phosphite Into a three neck round bottom flask equipped with sidearm trap and condenser, thermometer, agitator, and gas blowing tube, the glycerine and dehydrated castor oil were added and the two reactants heated to 400 degrees F. in 40 minutes and the litharge added. The temperature was increased to 440 degrees F. in an additional 15 minutes and held at that temperature until a clear pill was obtained upon addition of a small portion of phthalic anhydride to a small sample and cooling. Thereupon, the phthalic anhydride, bis(hydroxy propoxy phenyl) dimethyl methane and xylene were added and the mass reacted at a temperature of about 440 degrees F. under solvent reflux conditions. The batch was held at this temperature until a cure of 30 to 35 seconds and an acid value of 4 to 6 was obtained which required approximately five hours reflux time.

The batch was thereafter further reduced with xylene to a product having 60% non-volatile content, having a "Z" (Gardner) viscosity, and an acid value of 3.7. The alkali resistance of the resulting product was found to be superior to comparable products containing no bis(hydroxy propoxy phenyl) dimethyl methane.

In the foregoing example the bis(hydroxy propoxy phenyl) dimethyl methane contains 6% of all of the oxy groups of the alcohol radicals.

EXAMPLE II

*Baking vehicle*

487 parts bis(hydroxy propoxy phenyl) dimethyl methane
102 parts maleic anhydride
186 parts linseed fatty acids
3.5 parts litharge The above ingredients with the exception of the litharge were weighed into a flask equipped as described in Example I. The temperature was increased to approximately 400 degrees F. in one hour and held at this temperature for one and one-half hours, whereupon, the litharge was added and the temperature of the reaction mass increased to 420 degrees F. The temperature was held at 420 degrees F. for two hours and then allowed to fall back to 400 degrees±10 degrees for about 45 minutes. The product had an acid value of 20.6 and was reduced to 50% solids with xylene.

A 100 ml. sample of the reduced material was prepared for test by the addition of 2½ ml. of lead naphthenate drier containing 0.5% lead and the addition of 1¾ ml. of cobalt naphthenate drier containing 0.05% cobalt. After baking out in a thin film for 30 minutes at 300 degrees F., the baked film was hard and dry. On standing the film dried in the air.

EXAMPLE III 487 parts bis(hydroxy propoxy phenyl) dimethyl methane
116 parts fumaric acid
186 parts dehydrated castor fatty acids The above ingredients were weighed into a flask equipped as described in Example I, and an inert gas blanket maintained over the reactants during the cooking period. A temperature of 390 degrees F. was gained and after holding 390 degrees F. for two hours the temperature was increased to 420 degrees F. and held for three and one-half hours to an acid value of 29, a cure of five seconds and a viscosity of "X" (Gardner) when cut to 50% solids with xylene.

A 100 ml. sample containing 2½ ml. of lead naphthenate drier containing 0.5% lead and 1¾ ml. of cobalt naphthenate drier containing 0.05% cobalt was prepared and flowed out on a glass panel. The film set to touch in 20 minutes, set to kraft paper in 3¼ hours and was set to foil overnight.

A similar batch showed dry to foil in slightly more than four hours.

EXAMPLE IV

Into equipment similar to that described in Example I was weighed 1188 parts of bis(hydroxy propoxy phenyl) dimethyl methane, 253 parts of fumaric acid and 469 parts of linseed fatty acids. Under an inert blanket the reactants were heated to 390 degrees F. in 15 minutes and held at that temperature for two hours. The batch was thereafter elevated in temperature to 400 degrees F. and subjected to a light inert gas blow at that temperature for approximately six hours. When a cure had been obtained (115 seconds) 15 parts of rosin were added and the batch held again for a cure of 10 to 15 seconds.

The resulting rosin oil-modified alkyd resin was cut to 50% non-volatile material with xylene to yield a Gardner tube viscosity of "K" and a final cure of 9 seconds and an acid value of 17.

Upon addition of driers as described in previous examples, the film resulting from application of the product set to touch in 15 minutes, was kraft paper free in 2½ hours, and foil free in five hours.

The product possessed good resistance to alkalis.

EXAMPLE V

Into equipment as described in Example I were weighed 487 parts of bis(hydroxy propoxy phenyl) dimethyl methane, 116 parts of fumaric acid and 227 parts of linseed fatty acids. Under an inert gas blanket the reactants were heated to 390 degrees F. and held for two hours. The temperature was then increased to 400 degrees F. after having added 40 parts of pentaerythritol and the temperature held at 400 degrees F. for approximately one hour. The oil modified pentaerythritol-isopropylidene alkyd product was cut to 50% solids with xylene and the resulting varnish had a viscosity of "F" (Gardner), an acid value of 15, and a cure of 12 seconds.

After addition of lead and cobalt naphthenate to a sample or aliquot portion of the batch and application in a thin film to metal panels, a 30 minute bake at 300 degrees F. produced a dry, hard finish.

Another film of the product containing drier set to touch in slightly over one hour, and was kraft and metal foil free after overnight dry.

EXAMPLE VI

Into equipment similar to that used in Example I, 1900 parts of a refined tall oil and 2 parts of litharge were heated to 350 degrees F. in 30 minutes, whereupon, 539 parts of pentaerythritol were added. The temperature was raised to 400 degrees F., an additional 2 parts of litharge were added and the temperature again boosted to 400 degrees F. and held for 45 minutes, whereupon, 656 parts of phthalic anhydride were added. 35 minutes later, 171 parts of bis(hydroxy propoxy phenyl) dimethyl methane were added. The temperature having been maintained at 440 degrees F. was then boosted to 500 degrees F. and held for approximately 8 hours to a cure of 10 seconds and an acid value of 18.

The product resulting was cut to 50% solids with mineral spirits to yield a tall oil alkyd having a viscosity of "$Z_6$" (Gardner). Dried films had good flexibility and adhesion.

EXAMPLE VII

Into a stainless steel laboratory size kettle of one gallon capacity, fitted with a blow ring, condenser, thermometer and agitator, the following was weighed in: 745 parts of bodied dehydrated castor oil and 464 parts of glycerine. The batch was taken to 400 degrees F. in 15 minutes and 0.7 parts of litharge added to aid alcoholysis of the oil. The temperature of the reactants was further elevated to 440 degrees F. and held approximately one hour. 866 parts of phthalic anhydride and 278 parts of bis(hydroxy propoxy phenyl) dimethyl methane were added and the temperature maintained at 440 degrees F., meanwhile maintaining a $CO_2$ blanket over the batch. 440 degrees F. was maintained for about 4 hours additional time with a light $CO_2$ blow through the batch. The cure at the end of the cook was 20 and the acid value was 8.5. The batch was cut with xylene to a solids of 45.5% and a Gardner viscosity of "Z."

This vehicle proved to be extremely interesting as a baking vehicle. It was found that considerably less aminoaldehyde resin was necessary to obtain through dry and hardness than in comparable vehicles where no aryloxy alkanol formed a part of the condensation.

EXAMPLE VIII

Into a stainless steel varnish kettle similarly equipped to that described in the prior example, were weighed 2735 parts of alkali refined soya bean oil, 555 parts of glycerine and 652 parts of pentaerythritol and the batch was taken to 400 degrees F. in temperature, whereupon, 2.7 parts of litharge were added to assist alcoholysis. The temperature was held at 400 degrees F. for approximately 45 minutes, whereupon, 2582 parts of phthalic anhydride and 706 parts of bis(hydroxy propoxy phenyl) dimethyl methane were added and 460 degrees F. was regained in about 25 minutes and held for approximately one hour. During the latter period, a light inert gas blow was maintained through the batch. The acid value of the product was 16.8, the cure 9 to 10 seconds and the viscosity after cutting the mass with xylene to 50% solids content was "V" on the Gardner scale.

EXAMPLE IX

Into a stainless steel varnish kettle equipped as heretofore described were weighed 1188 parts of alkali refined soya bean oil, 229 parts of glycerine and 172 parts of bis(hydroxy propoxy phenyl) dimethyl methane and the temperature of the mixture thereafter increased to 400 degrees F. To assist alcoholysis, 1.2 parts of litharge were added. The temperature was increased to 440 degrees and allowed to coast down over a 45 minute interval, whereupon, 905 parts of rosin were added and the temperature fell to 330 degrees F. 280 parts of maleic anhydride were added and the temperature held at 375 degrees F. for approximately one hour to allow diene reaction between the maleic anhydride and rosin. 540 degrees F. was then gained in 40 minutes and held for 2½ hours to a 25 second cure, an acid value of 19.5 and a viscosity when cut to 50% solids with mineral spirits of "J" to "K" (Gardner).

A control sample of a batch made without the aryloxy alkanol, substituting glycerine therefor, was less tough in film character and less alkali resistant.

EXAMPLE X

Into a stainless steel varnish kettle equipped as heretofore described were weighed 1200 parts of soya bean oil fatty acids (Plastolein 9315—a product of Emery Industries) and 2301 parts of bis(hydroxy propoxy phenyl) dimethyl methane. 370 degrees F. was gained in 30 minutes and held for one hour, whereupon, 680 parts of hydroabietyl alcohol (Abitol—a product of Hercules Company) and 735 parts of phthalic anhydride were added. 460 degrees F. was gained in 30 minutes and the temperature held for approximately 9 hours while blowing the batch with $CO_2$ lightly during the last four or five hours of the cook. The resin solids had an acid value of 8; was reduced to 90% solids with toluene to give a viscosity of "Z" (Gardner).

This product was useful in bringing up the film solids of vinyl chloride polymer solutions and was completely compatible therewith.

In this example the bis(hydroxy propoxy phenyl) dimethyl methane contains 87 per cent of all of the oxy groups of alcohol radicals.

EXAMPLE XI

Into a three neck glass flask equipped with stirrer, thermometer, condenser and blow pipe were weighed, in five separate test runs, items 1, 2, and 3 below. The temperature was increased to 400 degrees F., item 4 added and the temperature again increased to 440 degrees F. where it was maintained for one hour. Items 5 and 6 or 7 were thereafter added and the temperature held at 410 degrees F. until a cure value of from 15 to 25 seconds was obtained which required from 2½ to 4 hours, depending upon the particular polyalcohols used.

TABLE I

| Item | Ingredient | Batch I | Batch II | Batch III | Batch IV | Batch V |
|---|---|---|---|---|---|---|
| 1 | low viscosity dehydrated castor oil | 171 | 171 | 171 | 171 | 171 |
| 2 | glycerine | 36 | 36 | 36 | 36 | 36 |
| 3 | other alcohol | $D_1$ 64 | $A_1$ 52.0 | $D_{13}$ 75 | $D_1$ 64 | $D_{14}$ 86 |
| 4 | litharge | 0.2 | 0.2 | 0.2 | 0.2 | 0.2 |
| 5 | phthalic anhydride | 190 | 198.5 | 190 | 198.5 | 190 |
| 6 | glycerine | 67 | | 67 | | 67 |
| 7 | other alcohol | | $A_1$ 28.5 | | | |
| 8 | toluene ml | 40–50 | 40–50 | 40–50 | 40–50 | 40–50 |

TABLE II

| Ident. | Viscosity | Color | Acid Value | Wt./Gal. | Cure |
|---|---|---|---|---|---|
| Batch I | $Z_2$ | 5–6 | 9.8 | 8.2 | 20″ |
| Batch III | $Z_2$–$Z_3$ | 5 | 6.9 | 8.2 | 20″ |
| Batch V | $Z_1$ | 5 | 5.7 | 8.2 | 20″ |

The above Table II shows the comparative characteristics of vehicles prepared with varying quantities of alkylene oxide in the side chain of the aryloxy alkanol under test. $D_1$ is bis(hydroxy propoxy phenyl) dimethyl methane, $A_1$ is ethylene glycol, $D_{13}$ is 4-hydroxy propoxy propoxy phenyl-4' hydroxy propoxy phenyl dimethyl methane, and $D_{14}$ is bis(hydroxy propoxy propoxy phenyl) dimethyl methane.

All of the vehicles prepared as shown in Table I were formulated into pigmented white enamel test paints having the identical formulation except for the vehicle used. These test paints were applied to cleaned steel panels in duplicate, one side, and baked for 30 minutes at 300 degrees F. and thereafter aged 72 hours under average room conditions in preparation for subsequent tests.

One set of panels was tested by subjecting them (a) to immersion in boiling water for 7 hours, (b) to immersion in 2% aqueous sodium hydroxide solution at 75 degrees F. to 77 degrees F. for 173 hours, and (c) to immersion in cold water for 193 hours at 75 degrees F. The other set of panels was subjected to spot tests by soaking a disk of filter paper in (d) iodine in 2% ethyl alcohol, (e) an oleic acid lard oil mixture, (f) 95% ethyl alcohol, (g) 2% caustic soda solution, (h) 5% acetic acid solution, and (i) 5% citric acid solution and placing the wetted disk on the enameled surface of the test panels for 18 hours.

TABLE III

| Test | Batch I | Batch II | Batch III | Batch Iv | Batch V |
|---|---|---|---|---|---|
| (a) | 5th place | 3rd place | Best—1st place | 2nd place | 4th place. |
| (b) | do | do | Best recovery | Slight loss in gloss. | 2nd place. |
| (c) | (2) | (2) | (2) | (2) | (2) |
| (d) | 2nd place | 5th place | 3rd place | 4th place | 1st place. |
| (e) | (2) | (2) | (2) | (2) | (2) |
| (f) | (2) | (2) | (2) | (2) | (2) |
| (g) | (2) | (2) | (2) | (2) | (2) |
| (h) | (2) | (2) | (2) | (2) | (2) |
| 60° Specular gloss | 74 | 74 | 77 | 74 | 76. |
| Thickness, mils | 1.75 | 1.9 | 2.0 | 1.7 | 2.1. |
| Pencil Hardness [1] | H-2H | F-H | H-2H | H-2H | HB-F. |
| Sward Rocker Hardness | 27 | 20 | 23 | 21 | 18. |

[1] Order of increasing pencil hardness—4B, 3B, 2B, HB, F, H, 2H, and 3H.
[2] All panels equivalently good.

From Table III it can be determined that the batch made with glycerine and ethylene glycol (batch II) is softer and generally poorer where differences can be observed than those in which the alcohol is of the aromatic polyoxyalkanol type. The batch with the odd number of alkoxy groups in the aromatic polyoxyalkanol seemed to stand out in resistance to boiling water and immersion in caustic soda.

EXAMPLE XII

Three hundred thirty (330) parts of caustic soda were dissolved in 1800 parts of water to which 440 parts of resorcinol were added. The reactants were heated and agitated to form a solution. At 160 degrees F., 708 parts of ethylene chlorohydrin were added dropwise over a 75 minute period, the final temperature was 180 degrees F. The reactants were further held at 160 degrees F. to 170 degrees F. for two hours. After the batch had cooled to 150 degrees F., the pH was adjusted to 7 with a dilute sulfuric acid solution. After several minutes additional acid was added to bring the pH to 5.5.

The acidified product was then subjected to vacuum distillation to remove water and unreacted constituents and the salt removed by filtration.

Into a suitable reaction vessel were weighed 171 parts of low viscosity dehydrated castor oil, 36 parts of glycerine and 42½ parts of 1,3 - bis(hydroxy ethoxy) benzene from the above preparation. Approximately 30 ml. of toluene and 0.2 part of litharge were added. The temperature increased by removal of toluene until a temperature of from 400 degrees F. to 420 degrees F. was obtained and thereafter the toluene distilling was returned to the reaction vessel from a condenser mounted thereon. The temperature was held at 420 degrees F. for two hours, whereupon 190 parts of phthalic anhydride and 67 additional parts of glycerine were added and the temperature held at 410 degrees F. for a cure of 20 seconds.

The resulting oil modified resinous product had an acid value of 10. The resulting vehicle was characterized by its superior hardness and alkali resistance when employed in a baking finish and baked at 300 degrees F. for 30 minutes.

EXAMPLE XIII

One hundred twenty-six (126) parts of phloroglucinol were weighed into a reaction flask containing 130 parts of sodium hydroxide dissolved in 500 parts of water. The reactants were heated to 160 degrees F. and subjected to agitation.

At 160 degrees F., ethylene chlorohydrin was added dropwise to the sodium salt of phloroglucinol over a one hour period until 253 parts of ethylene chlorohydrin had been added. The temperature of the mass was held at 160 degrees F. for two hours. The batch was cooled, and acidified to a pH of 5.7 first, with dilute sulfuric and later dilute oxalic acid. The salt formed was removed and the batch subjected to vacuum distillation to remove unreacted material. A dark, viscous product resulted.

Under an inert blanket of $CO_2$ in a suitable reaction vessel equipped with stirrer, condenser and thermometer, 90 parts of tris(hydroxy ethoxy) benzene from above and 95 parts of glycerine were weighed in, in conjunction with 0.2 part of litharge and 550 parts of linseed oil fatty acids. The temperature was increased to 400 degrees F. and held for two hours. Thereafter, 148 parts of phthalic anhydride were added to the reaction mixture and the temperature brought back to 400 degrees F. and held for eight hours. Thereafter, the temperature was increased to 450 degrees F. and held for an additional two hours and the batch subjected to a strong $CO_2$ blow.

The oil modified alkyd vehicle formed, when combined with traces of cobalt and lead naphthenate and applied in thin films, dried to form a film having good alkali resistance.

EXAMPLE XIV 2,4,2',4' tetra hydroxy diphenyl methane is formed in accordance with the procedure outlined in volume 6, 4th edition of Beilstein, page 1166.

One hundred sixty-five (165) parts of sodium hydroxide are dissolved in 800 parts of water and 232 parts of the above phenol are dissolved therein. The batch is heated to 175 degrees F. and 350 parts of ethylene chlorohydrin added while maintaining the temperature between 160 degrees F. to 180 degrees F. over a period of one hour. After addition the mass is held at this temperature for two hours and cooled to remove the salt formed. Excess unreacted ethylene chlorohydrin and water are removed by vacuum distillation to leave the corresponding bis-(hydroxy diethoxy phenyl) methane.

Two hundred forty-five parts of 2,4,2',4' tetrakis (beta hydroxy ethoxy) diphenyl methane as formed above, 1240 parts of alkali refined soya bean oil, and 0.2 part of litharge are weighed into a reaction vessel similar to that used in the latter part of Example I, the batch heated to 420 degrees F. and held under an inert $CO_2$ atmosphere for one hour with good agitation. Thereafter, 140 parts of phthalic anhydride are added, the temperature returned to 420 degrees F., and the batch held for a 30 second cure. The resulting resin may be reduced with xylene to a brushing viscosity. Upon further addition of 10 parts of 6% cobalt naphthenate and 6 parts of 24% lead naphthenate driers, the resulting varnish film dries to a hard, lustrous surface which exhibits outstanding resistance to attack by strongly alkaline soaps.

EXAMPLE XV 3,4,5 bis(trihydroxy phenyl) methane is formed in accordance with the procedure outlined in Beilstein, volume 6, 4th edition, page 1202.

Two hundred fifty (250) parts of sodium hydroxide are dissolved in 1000 parts of water and 264 parts of the above phenol are dissolved therein by heating to between 160 degrees F. to 170 degrees F. with agitation. After solution is obtained, 525 parts of ethylene chlorohydrin are added to the aqueous solution slowly over a two hour period, meanwhile maintaining the mass under the same degree of heat and agitation. After all the ethylene chlorohydrin is added the reactants are maintained at 160 degrees F. to 170 degrees F. for two hours to insure efficient reaction. The mass is then cooled, the pH reduced to 5.6 with dilute sulfuric acid, the salt formed removed, and the excess unreacted ethylene chlorohydrin and the water removed therefrom by distillation of the aqueous mass under reduced pressure.

Five hundred twenty-eight (528) parts of the product obtained, e. g., 3,4,5 bis(trihydroxy tri-ethoxy phenyl) methane, are reacted with 1100 parts of soya bean oil fatty acids at 375 degrees F. to 400 degrees F. for six hours. Then 148 parts of phthalic anhydride are added and the temperature held within the range of 390 degrees F. to 410 degrees F. for an additional 4 hours to bring the acid value to less than 20. Excess acids are then removed by blowing the batch with carbon dioxide vigorously for twenty minutes, holding the temperature within the range indicated.

A drying oil modified resin having good alkali resistance and drying character is obtained.

EXAMPLE XVI 2,4,2',4' tetrahydroxy biphenyl is prepared in accordance with the procedure outlined in Beilstein, volume 6, 4th edition, page 1163.

One hundred sixty-five (165) parts of sodium hydroxide are dissolved in 800 parts of water into which 218 parts of the above phenol are added and dissolved by heating the aqueous medium to 160 degrees F. along with agitation of the reactants. To the newly formed sodium salt of the tetrahydroxy biphenyl are added 355 parts of ethylene chlorohydrin slowly over a one hour period, meanwhile maintaining the temperature of the reactants between 160 degrees F. to 180 degrees F., both during the addition and for two hours thereafter to allow adequate reaction time. Thereafter, the batch is cooled to room temperature, the pH adjusted to 5.5 to 5.8 with dilute sulfuric acid, cooled, and the salt formed removed. Thereafter, the remaining part of the batch is subjected to vacuum distillation to remove water and unreacted excess ethylene chlorohydrin.

Four hundred twenty (420) parts of the distilland, 2,4,2',4' tetrakis(beta hydroxy ethoxy) biphenyl are then reacted with 560 parts of linseed oil fatty acids at 400 degrees F. under an inert gas atmosphere for ten hours, whereupon, 148 parts of phthalic anhydride are added and the temperature maintained at the same level for an additional four hours. The batch is thereafter vigorously blown with an inert gas for 20 minutes at the same temperature to remove excess acidic material. The resulting oil modified resin, upon addition of the usual driers and further reduction with a volatile solvent, e. g., toluene, and applied in thin films dried hard in the air to form a film having good alkali resistance.

EXAMPLE XVII

Two mols of beta naphthol are condensed with one mol of formaldehyde in accordance with the procedure outlined in Beilstein, volume 6, 4th edition, page 1053, to produce bis(hydroxy naphthyl) methane.

Ninety (90) parts of sodium hydroxide are dissolved in 600 parts of water and 300 parts of the above formaldehyde beta naphthol condensation product were added and dissolved therein by heating and agitation. To the aqueous solution at 160 degrees F. are added 180 parts of ethylene chlorohydrin slowly over a one hour period. After all the ethylene chlorohydrin is in, temperature and agitation are maintained for an additional two hours. Thereafter, the reactants are cooled to room temperature, the pH adjusted to 5.5 to 5.8 with dilute sulfuric acid and cooled, the salt formed removed, and the remaining material of the batch subjected to vacuum distillation to remove water and unreacted ethylene chlorohydrin.

Four hundred (400) parts of the distilland are weighed into a reaction flask containing a product formed in the following manner.

Eight hundred sixty (860) parts of alkali refined soya bean oil are alcoholized to form a mixture of mono- and diglycerides by heating it in conjunction with 100 parts of glycerine at 400 degrees F. for one-half hour in the presence of .1 part of litharge.

Into the principal reaction mass are thereafter weighed 375 parts of phthalic anhydrde and the temperature of the reactants taken to 375 degrees F. for six hours. The temperature is thereafter increased to 420 degrees F. and blown back down with an inert gas to 375 degrees F. to remove excess unreacted material.

The resulting oil modified resin when applied in thin films with the usual cobalt and lead naphthenate, dries (air-dried) to form an elastic film having good alkali resistance.

EXAMPLE XVIII

4-,4',4'" tris(hydroxy phenyl) methane (leucaurine) is prepared in accordance with the procedure outlined in Beilstein, volume 6, 4th edition, page 1143.

One hundred twenty-five (125) parts of sodium hydroxide are dissolved in 900 parts of water and 292 parts of the above polyhydroxy compound added to the aqueous alkaline solution and dissolved therein by heating and agitation. To the sodium salt of the phenol thus formed are added 280 parts of ethylene chlorohydrin slowly over a period of 1½ hours. After all the chlorohydrin is in the reaction mass, it is held at 160 degrees F. for an additional two hours. The reaction mass is cooled to 75 degrees F. and the pH adjusted to between 5.5 and 6 with sulfuric acid. The salt formed is removed and the remainder of the batch vacuum distilled to remove unreacted excess ethylene chlorohydrin and water.

Forty-one (41) parts of endomethylene tetrahydrophthalic anhydride (formed through condensation of equal molar parts of maleic anhydride and cyclopentadiene) are weighed into a reaction vessel equipped with an agitator, thermometer, condenser and return trap along with 225 parts of 4-,4',-4''' tris(hydroxy ethoxy phenyl) methane and 280 parts of linseed fatty acids. A blanket of $CO_2$ is bled in over the batch to prevent oxidation, the temperature increased to 400 degrees F., and removal of water facilitated by reflux of a small proportion of toluene which has been added to the batch (e. g., 25 to 50 ml. of toluene). Water formed is separated from the batch in the side arm trap. The temperature of the batch is held constant until the acid value is reduced to 15 to 16. Thereafter, the fire is shut off and after cooling to 300 degrees F., the batch is reduced with xylene. Upon addition of cobalt and lead driers and application in a thin film, a hard, glossy finish having exceptional resistance to alkali is obtained.

From the foregoing description it will be apparent that the polymeric compositions of the present invention are made by condensing the carboxyl groups of one or more polybasic acids with the hydroxyl groups of one or more polyhydric alcohols including one or more alcohol ethers of aromatic compounds (i. e., aromatic polyether alcohols) in quantities corresponding to at least one available alcohol hydroxyl group for each carboxyl group and up to approximately 60% by weight of the total resultant polymer of an unsaturated monocarboxylic acid (or the equivalent amount of an ester of said acid). Although the quantity of the aromatic polyether alcohol may be varied, it is preferable that the aromatic polyether alcohol supply at least about 10% of the total mol equivalents of the polyhydric alcohol theoretically required for complete esterification of the acids. Where the products are to be used as plasticizers, all of the polyhydric alcohol requirements may be supplied by a dihydric aromatic polyether alcohol, but where the products are required to have suitable drying properties, it is preferable to supply a portion of the polyhydric alcohol requirements with a polyhydric alcohol having a functionality greater than two. This may be an aromatic polyether alcohol having more than two ether alcohol groups, or a dihydric polyether alcohol may be used in conjunction with an aliphatic polyhydric alcohol containing three or more hydroxyl groups. In the latter event, it is preferable that not more than 60% of the total mol equivalents of polyhydric alcohol be a dihydric aromatic polyether alcohol. An excess of polyhydric alcohol over the theoretical quantity is preferably employed to obtain low acid value or nearly neutral products. Although the functionality of the reactants will govern the quantities used good results have been obtained normally where the quantity of aromatic polyether alcohol employed has been sufficient to supply at least 10% of the total polyhydric alcohol theoretically required for esterification of the acids and where the quantity of unsaturated monocarboxylic acid has been within the range of 25% to 60% by weight of the total polymeric material.

By the term "mol equivalent of a polycarboxylic acid" is meant the molecular weight of the acid divided by the number of carboxyl groups in the acid. Similarly, the "mol equivalent of the alcohol" is the molecular weight of the specific alkanol divided by the number of alcohol (—OH) groups in the molecule.

The "cure point" is a means of observing the degree of progress of a polymerization reaction. The cure point is determined by exposing a drop of the reactants to the polished surface of a metal slab maintained at 200 degrees C. (392 degrees F.). Immediately upon exposure of the drop to the surface, it is spread out over the largest possible area with a pointed metal tool. At the moment of application of the drop to the plate, a timer is started. The film is continuously spread until gelation occurs, and the time required for gelation is noted. The elapsed time from the application of the drop to the cure plate until gelation in the film is the cure point.

The "bar melting point" refers to a determination of the melting point of the resin according to the method of Dennis and Shelton, Journal American Chemical Society 52, 3128 (1930), on an instrument made by the Parr Instrument Company of Moline, Illinois.

The terms "Gardner-Holdt viscosity" and "melting point by ball and ring method" will be found fully described on pages 300 and 470, respectively, of the 10th edition of Henry A. Gardner's book, "Physical and Chemical Examintion of Paints, Varnishes, Lacquers, and Colors."

The term "acid value" signifies the number of milligrams of potassium hydroxide necessary to neutralize the acidity of one gram of sample of the resulant ester compound.

In the specification and the claims the term or phrase, "polycarboxylic acid compound" is intended to include polycarboxylic acids, polycarboxylic anhydrides where anhydrides are formed, and in certain instances the diene addition product of said acids with another unsaturated compound capable of undergoing a diene addition in reaction mixtures when the polycarboxylic acids or anhydrides are unsaturated, as in the alpha-beta unsaturated dicarboxylic acids.

In the same spirit, the term "maleic acid compound" is intended to include maleic acid, maleic anhydride, and the maleic adducts formed through addition of maleic with another unsaturant through a diene reaction.

The term "phthalic acid compound" is intended to include the 1,2, 1,3, and 1,4 isomers of phthalic acid and any anhydrides thereof.

It is the intent that the term "compound," therefore, be limiting upon the terms "polycarboxylic acid," "maleic acid" and "phthalic acid" according to the above, when these last mentioned terms are followed by the word "compound."

The expression aryl polyoxyalkoxy ether alkanol is intended to include and cover compounds having one aryl nucleus with at least two oxyalkanol groups attached to a carbon atom thereof as well as compounds containing a plurality of aryl nuclei each having at least one oxyalkanol group attached to a carbon atom thereof. In every case, therefore, the alkanol group is the terminal group of an aliphatic chain which is connected through an oxygen atom to the carbon atom of an aryl carbocyclic ring. The aliphatic chain of which the alkanol group is a part may contain only a single ether linkage which is attached to a carbon atom of the aryl nucleus or it may contain one or more intervening oxyalkylene groups. The term "oxyalkanol" is intended to cover such aliphatic side chains regardless of whether they consist of a single oxygen atom connected through an alkylene group to a hydroxy group, as, for example, —O—C₂H₄OH, —O—C₃H₆OH, —O—C₄H₈OH, —O—C₅H₁₀OH, and —O—C₆H₁₂OH, or whether they contain multiple ether linkages, as, for example, —O—C₂H₄—O—C₂H₄.OH

—O—C₃H₆—O—C₃H₆.OH
—O—C₄H₈—O—C₄H₈.OH
—O—C₂H₄—O—C₃H₆.OH and —O—C₃H₆—O—C₂H₄.OH.

The term "alkylene" as employed herein covers straight and branch chain divalent saturated hydrocarbon groups, for example, methylene, ethylene, propylene, 1,2 propylene, butylene, amylene, hexylene and the higher homologues.

The invention is hereby claimed as follows:

1. A resin which is the product of the reaction of phthalic anhydride, an alcoholized drying oil derived by alcoholizing a drying oil with a polyhydric alcohol, and bis(hydroxy propoxy phenyl) dimethyl methane, the quantity of unsaturated acid in the drying oil being at least 25% and not more than about 60% of the total weight of the resultant composition, the total quantity of the polyhydric alcohol being at least equivalent to that required to esterify the free carboxyl groups of the carboxylic acids and not exceeding a 100% mol excess, the quantity of the bis(hydroxy propoxy phenyl) dimethyl methane being at least about 10% and not more than about 60% of the total mol equivalents of polyhydric alcohol, the remainder of the polyhydric alcohol containing at least three alcoholic hydroxyl groups.

2. A resin which is the product of the reaction of a maleic anhydride adduct, drying oil fatty acids and a polyhydric alcohol comprising bis(hydroxy propoxy phenyl) dimethyl methane, the quantity of the drying oil acids being at least 25% and not more than about 60% of the total weight of the resultant composition, the total quantity of polyhydric alcohol being at least equivalent to that required to esterify the free carboxyl groups of the carboxylic acids and not exceeding a 100% mol excess, the quantity of the bis(hydroxy propoxy phenyl) dimethyl methane being at least about 10% and not more than about 60% of the total mol equivalents of polyhydric alcohol, the remainder of the polyhydric alcohol containing at least three alcoholic hydroxyl groups.

3. A resin which is the product of the reaction of phthalic anhydride, tall oil, pentaerythritol and bis(hydroxy propoxy phenyl) dimethyl methane, the quantity of the unsaturated monocarboxylic organic acids being at least 25% and not more than about 60% of the total weight of the resultant composition, the quantity of polyhydric alcohol being at least equivalent to that required to esterify the free carboxyl groups of the carboxylic acids and not exceeding a 100% mol excess, the quantity of bis(hydroxy propoxy phenyl) dimethyl methane being at least about 10% and not more than about 60% of the total mol equivalents of the polyhydric alcohol.

4. A resin which is the product of the reaction of phthalic anhydride, an alcoholized oil derived by alcoholizing dehydrated castor oil with glycerine, and bis(hydroxy propoxy phenyl) dimethyl methane, the quantity of unsaturated acid in the dehydrated castor oil being at least 25% and not more than about 60% of the total weight of the resultant composition, the quantity of the polyhydric alcohol being at least equivalent to that required to esterify the free carboxyl groups of the carboxylic acids and not exceeding a 100% mol excess, the quantity of the bis(hydroxy propoxy phenyl) dimethyl methane being at least about 10% and not more than about 60% of the total equivalents of polyhydric alcohol.

5. A resin which is the product of the reaction of at least one polycarboxylic organic acid, at least one unsaturated monocarboxylic organic acid, and a polyhydric alcohol in which a portion of the polyhydric alcohol is an alkylidene polyaryloxyalcohol having the following general formula:

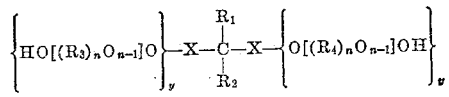

where X is arylene, $n$ is a whole number from one through four, $y$ is a whole number from one to three, $R_1$ is from the group consisting of phenyl, alkyl and hydrogen, $R_2$ is from the group consisting of hydrogen and alkyl, and $R_3$ and $R_4$ are alkylene groups, the quantity of said unsaturated acid being at least 25% and not more than about 60% of the total weight of the resultant composition, the quantity of polyhydric alcohol being at least equivalent to that required to esterify the free carboxyl groups of said acids and not exceeding 100% mol excess, and the quantity of the alkylidene polyaryloxyalcohol constituting at least 6% and not more than 87% of all of the oxy groups of the total alcohol radicals.

6. A resin which is the product of the reaction of at least one polycarboxylic organic acid, at least one unsaturated monocarboxylic organic acid, and a polyhydric alcohol in which a portion of the polyhydric alcohol is an alkylidene polyaryloxyalcohol having the following general formula:

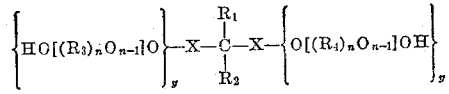

where X is arylene, $n$ is a whole number from one through four, $y$ is a whole number from one to three, $R_1$ is from the group consisting of phenyl, alkyl and hydrogen, $R_2$ is from the group consisting of hydrogen and alkyl, and $R_3$ and $R_4$ are alkylene groups, the quantity of said unsaturated acid being at least 25% and not more than about 60% of the total weight of the resultant composition, the quantity of polyhydric alcohol being at least equivalent to that required to esterify the free carboxyl groups of said acids and not exceeding 100% mol excess, and the quantity of said alkylidene polyaryloxyalcohol being at least about 10% and not more than about 60% of the total mol equivalents of polyhydric alcohol.

7. A resin which is the product of the reaction of at least one polycarboxylic organic acid, at least one unsaturated monocarboxylic organic acid, and a polyhydric alcohol in which a portion of the polyhydric alcohol is bis(hydroxy propoxy phenyl) dimethyl methane, the quantity of said unsaturated acid being at least 25% and not more than about 60% of the total weight of the resultant composition, the quantity of polyhydric alcohol being at least equivalent to that required to esterify the free carboxyl groups of said acids and not exceeding 100% mol excess, and the quantity of the bis(hydroxy propoxy phenyl) dimethyl methane being at least about 10% and not more than about 60% of the total mol equivalents of polyhydric alcohol.

References Cited in the file of this patent

UNITED STATES PATENTS

| Number | Name | Date |
|---|---|---|
| 1,847,783 | Pieper | Mar. 1, 1932 |
| 1,853,049 | Hoover | Apr. 12, 1932 |
| 2,331,265 | Coleman et al. | Oct. 5, 1943 |
| 2,363,581 | Frosch | Nov. 28, 1944 |
| 2,437,046 | Rothrock et al. | Mar. 2, 1948 |
| 2,444,594 | Day et al. | July 6, 1948 |
| 2,503,726 | Greenlee | Apr. 11, 1950 |
| 2,504,518 | Greenlee | Apr. 18, 1950 |
| 2,579,329 | Martin | Dec. 18, 1951 |
| 2,626,939 | Hoogsteen et al. | Jan. 27, 1953 |